(12) United States Patent
Itou et al.

(10) Patent No.: US 9,160,557 B2
(45) Date of Patent: Oct. 13, 2015

(54) COMMUNICATION ADDRESS DETECTION APPARATUS, CONNECTOR WITH BUILT-IN CONTROL CIRCUIT, AND COMMUNICATION ADDRESS DETECTION METHOD

(75) Inventors: Kenn Itou, Shizuoka (JP); Akiyoshi Kanazawa, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 892 days.

(21) Appl. No.: 13/258,509

(22) PCT Filed: Mar. 26, 2010

(86) PCT No.: PCT/JP2010/055437
§ 371 (c)(1),
(2), (4) Date: Sep. 22, 2011

(87) PCT Pub. No.: WO2010/116906
PCT Pub. Date: Oct. 14, 2010

(65) Prior Publication Data
US 2012/0020401 A1 Jan. 26, 2012

(30) Foreign Application Priority Data
Apr. 9, 2009 (JP) ................................. 2009-094589

(51) Int. Cl.
*G06F 3/00* (2006.01)
*H04L 12/40* (2006.01)
*H04L 29/12* (2006.01)

(52) U.S. Cl.
CPC ............ *H04L 12/40019* (2013.01); *G06F 3/00* (2013.01); *H04L 29/12254* (2013.01);
(Continued)

(58) Field of Classification Search
CPC .................................. G06F 3/00; G06F 13/42

USPC .............. 710/3, 4, 9, 300–302, 104, 105, 110
See application file for complete search history.

(56) References Cited

U.S. PATENT DOCUMENTS 4,730,251 A * 3/1988 Aakre et al. ................... 710/104
5,414,659 A * 5/1995 Ito ................................. 365/200
(Continued)

FOREIGN PATENT DOCUMENTS

| JP | 8-88641 A | 4/1996 |
|---|---|---|
| JP | 2003-229855 A | 8/2003 |
| JP | 2008-293747 A | 12/2008 |

OTHER PUBLICATIONS

International Search Report (PCT/ISA/210) issued on Jun. 15, 2010 in the International Patent Application No. PCT/JP2010/055437.
(Continued)

*Primary Examiner* — Khanh Dang
(74) *Attorney, Agent, or Firm* — Sughrue Mion, PLLC

(57) ABSTRACT

There is provided a communication address detection apparatus, a connector with a built-in control circuit, and a communication address detection method capable of preventing abnormal operations even in cases when a voltage level to be input to any one of a plurality of communication address setting terminals has inverted due to some faults. In a communication address detection apparatus for detecting a communication address in accordance with a combination of voltage levels of high or low levels input to a plurality of communication address setting terminals, the combination of the voltage levels with the assigned communication address is set which is stored in a communication address information storing unit (172) is set so as to become a combination of the voltage levels that has no assigned communication address when any one of the voltage levels in the combination of the voltage levels has inverted.

3 Claims, 7 Drawing Sheets

(52) U.S. Cl.
CPC ...... *H04L29/12264* (2013.01); *H04L 61/2038* (2013.01); *H04L 61/2046* (2013.01); *H04L 2012/40273* (2013.01)

(56) References Cited

U.S. PATENT DOCUMENTS

| | | | | |
|---|---|---|---|---|
| 5,530,895 | A | * | 6/1996 | Enstrom ............................ 710/9 |
| 5,619,724 | A | * | 4/1997 | Moore ............................... 710/9 |
| 5,740,379 | A | * | 4/1998 | Hartwig ........................ 710/104 |
| 6,339,831 | B1 | * | 1/2002 | Sugawara et al. ................. 714/3 |
| 6,438,625 | B1 | * | 8/2002 | Olson ............................... 710/9 |
| 6,564,278 | B1 | * | 5/2003 | Olson ............................ 710/301 |
| 7,013,355 | B2 | * | 3/2006 | Chambers ..................... 710/110 |
| 7,181,591 | B2 | * | 2/2007 | Tsai ............................... 711/212 |
| 7,668,991 | B2 | * | 2/2010 | Kopplin ........................ 710/104 |
| 2004/0071155 | A1 | * | 4/2004 | Marino et al. ................ 370/452 |
| 2008/0293266 | A1 | | 11/2008 | Kanazawa et al. |
| 2009/0327540 | A1 | * | 12/2009 | Robertson et al. ............ 710/104 |

OTHER PUBLICATIONS

Written Opinion (PCT/ISA/237) issued on Jun. 15, 2010 in the International Patent Application No. PCT/JP2010/055437.

Communication from the German Patent Office dated Sep. 3, 2014, in a counterpart German application No. 112010001587.2.

* cited by examiner

| COMMUNICATION ADDRESS | TERMINAL 21a | TERMINAL 21b | TERMINAL 21c |
|---|---|---|---|
| 0 | 0 | 1 | 1 |
| 1 | 1 | 0 | 1 |
| 2 | 1 | 1 | 0 |
| 3 | 0 | 0 | 0 |

| KIND OF THE NUMBER OF HIGH LEVELS | EVEN NUMBER |
|---|---|

| COMMUNICATION ADDRESS | TERMINAL 21a | TERMINAL 21b | TERMINAL 21c |
|---|---|---|---|
| 0 | 1 | 0 | 0 |
| 1 | 0 | 1 | 0 |
| 2 | 0 | 0 | 1 |
| 3 | 1 | 1 | 1 |

J21

| KIND OF THE NUMBER OF HIGH LEVELS | ODD NUMBER |
|---|---|

| COMMUNICATION ADDRESS | TERMINAL a | TERMINAL b | TERMINAL c | TERMINAL d |
|---|---|---|---|---|
| 0 | 0 | 1 | 1 | 1 |
| 1 | 1 | 0 | 1 | 1 |
| 2 | 1 | 1 | 0 | 1 |
| 3 | 1 | 1 | 1 | 0 |
| 4 | 0 | 0 | 0 | 1 |
| 5 | 0 | 0 | 1 | 0 |
| 6 | 0 | 1 | 0 | 0 |
| 7 | 1 | 0 | 0 | 0 |

J31

| KIND OF THE NUMBER OF HIGH LEVELS | ODD NUMBER |
|---|---|

J32

COMMUNICATION ADDRESS DETECTION APPARATUS, CONNECTOR WITH BUILT-IN CONTROL CIRCUIT, AND COMMUNICATION ADDRESS DETECTION METHOD

TECHNICAL FIELD

The present invention relates to a communication address detection apparatus for detecting communication addresses in accordance with combinations of voltage levels of high or low levels input to a plurality of communication address setting terminals, and relates to a connector with a built-in control circuit including the communication address detection apparatus, and a communication address detection method used in the communication address detection apparatus.

BACKGROUND ART

A vehicle such as an automobile is provided with a plurality of actuators for driving a window, a mirror, etc. The plurality of actuators are connected to an electronic control unit (ECU) by a wire harness constructed by bundling a plurality of electric wires. Each of the actuators performs operations of, for example, opening and closing of the window or angle adjustment of the mirror in response to control information by sending and receiving the control information through the wire harness.

Then, there is a problem that the wire harnesses increase in proportion to the number of actuators in the case of being configured to individually connect these plurality of actuators to the ECU by the wire harnesses. As a result, using one or a few wire harnesses, the plurality of actuators are mutually connected to the ECU by a bus. Then, identification is enabled by setting mutually different communication addresses in the ECU and each of the actuators and also the communication address is added to control information traveling in the wire harnesses and a destination of the control information is specified. Thus, communication between the plurality of actuators and the ECU can be conducted by one or a few wire harnesses and an increase in the wire harness is suppressed (see Patent Literature 1 as one example).

CITATION LIST

Patent Literature

Patent Literature 1: JP-A-8-88641

SUMMARY OF THE INVENTION

Technical Problem

As a general configuration of setting a communication address in each of the actuators described above, a configuration in which a plurality of communication address setting terminals are provided and the communication addresses are set according to combinations of voltage levels input to the plurality of communication address setting terminals is known. The voltage level input to each of the communication address setting terminals is a power source voltage or a high level (hereinafter also called "1") near to the power source voltage, or 0 V or a low level (hereinafter also called "0") near to 0 V.

The plurality of communication address setting terminals are connected to the power source voltage through a resistor (that is, pull-up), and a high level is input as the voltage level. A low level is input as the voltage level by connecting a predetermined communication address setting terminal of the plurality of communication address setting terminals to a ground through a jumper switch, a wire harness, or the like. In this manner, by inputting a combination of predetermined voltage levels ("1" or "0") to the plurality of communication address setting terminals, the communication address assigned to the combination of the voltage levels is set in the actuators.

However, in the configuration described above, due to faults such as poor contact of the jumper switch or a break in the wire harness, the high level (that is, the voltage level at the time of the break) may be erroneously input to the communication address setting terminal to which the low level is essentially to be input. Or, due to a fault such as a short circuit in the wire harness, the low level (that is, the voltage level at the time of the short circuit) may be erroneously input to the communication address setting terminal to which the high level is essentially to be input. That is, the voltage level to be input to the communication address setting terminal may have inverted due to the faults described above. As a result, the combination of the voltage levels input to the communication address setting terminal of the actuator in which the fault described above occurs becomes equal to a combination of the voltage levels input to the communication address setting terminals of the other actuators. Thus, the communication addresses overlap in the plurality of actuators.

A configuration in which communication addresses are respectively assigned to combinations of a plurality of voltage levels input to three communication address setting terminals a, b, c as shown in a communication address table K of FIG. 10 is considered as one example. When a wire of the terminal b is broken in the combination (terminal a, terminal b, terminal c)=("0", "0", "1") of the voltage levels to which, for example, "3" is assigned as the communication address in the combinations of these plurality of voltage levels, the combination of the voltage levels becomes (terminal a, terminal b, terminal c)=("0", "1", "1") and becomes equal to the combination of the voltage levels to which "6" is assigned as the communication address, and the communication addresses overlap. Or, when the terminal c is short-circuited to a ground in the combination (terminal a, terminal b, terminal c)=("0", "0", "1") of the voltage levels to which "3" is assigned as the communication address, the combination of the voltage levels becomes (terminal a, terminal b, terminal c)=("0", "0", "0") and becomes equal to the combination of the voltage levels to which "0" is assigned as the communication address, and the communication addresses overlap also in this case.

Then, when the communication addresses overlap in the plurality of actuators, there is a problem that, for example, control information aimed at another actuator traveling on a bus is erroneously processed and abnormal operations such as a malfunction or runaway are caused.

An object of the invention is to solve issues related to the problems described above. That is, the object of the invention is to provide a communication address detection apparatus, a connector with a built-in control circuit, and a communication address detection method capable of preventing abnormal operations even in cases when a voltage level to be input to any one of a plurality of communication address setting terminals has inverted due to some faults.

Solution to Problem

In order to achieve the object described above, as shown in a basic configuration diagram of FIG. 1, a first aspect of the present invention is a communication address detection apparatus for detecting a communication address in accordance with a combination of voltage levels of high or low levels input to a plurality of communication address setting terminals 21, the communication address detection apparatus including: a communication address information storing unit 172 in which communication address information is stored, the communication address information being determined so that a relation between combinations of the voltage levels and communication addresses assigned to the combinations is preset and also the combination of the voltage levels with the assigned communication address is set so as to become a combination of the voltage levels that has no assigned communication address when any one of the voltage levels in the combination of the voltage levels has inverted; a voltage level detecting unit 171*a* that detects the combination of the voltage levels input to the plurality of communication address setting terminals 21; a communication address assignment determining unit 171*b* that determines whether or not the communication address is assigned to the combination of the voltage levels detected by the voltage level detecting unit 171*a* according to the communication address information stored in the communication address information storing unit 172; and an abnormality processing unit 171*c* that performs predetermined abnormality processing when the communication address assignment determining unit 171*b* determines that the communication address is not assigned to the combination of the voltage levels detected by the voltage level detecting unit 171*a*.

A second aspect of the present invention is the communication address detection apparatus according to the first aspect, wherein the combinations of the voltage levels with the assigned communication addresses in the communication address information are selected from among a plurality of combinations of the voltage levels in which the number of high levels included in the combination of the voltage levels becomes an even number, or are selected from among a plurality of combinations of the voltage levels in which the number of high levels included in the combination of the voltage levels becomes an odd number.

A third aspect of the present invention is a connector with a built-in control circuit, including: a plurality of communication address setting terminals; and a communication address detection apparatus for detecting a communication address in accordance with a combination of voltage levels of high or low levels input to the plurality of communication address setting terminals, wherein the communication address detection apparatus according to the first or second aspect is provided as the communication address detection apparatus of the connector with the built-in control circuit.

A fourth aspect of the present invention is a communication address detection method used in a communication address detection apparatus for detecting a communication address in accordance with a combination of voltage levels of high or low levels input to a plurality of communication address setting terminals, the communication address detection method sequentially including: a voltage level detecting step of detecting the combination of the voltage levels input to the plurality of communication address setting terminals; a communication address assignment determining step of determining whether or not the communication address is assigned to the combination of the voltage levels detected in the voltage level detecting step in accordance with communication address information in which a relation between combinations of the voltage levels and communication addresses assigned to the combinations are preset and also the combination of the voltage levels with the assigned communication address is set so as to become a combination of the voltage levels that has no assigned communication address when any one of the voltage levels in that voltage level combination has inverted; and an abnormality processing step of performing predetermined abnormality processing when the communication address assignment determining step determines that the communication address is not assigned to the combination of the voltage levels detected in the voltage level detecting step.

Advantageous Effects of the Invention

According to the first or fourth aspect, the combination of voltage levels with the assigned communication address is set so as to become a combination of voltage levels that has no assigned communication address when any one of the voltage levels in the combination of the voltage levels has inverted (that is, the high level changes to the low level, or the low level changes to the high level). Thus, when the voltage level input to one of the plurality of communication address setting terminals to which the combination of voltage levels with the assigned communication address is input has inverted due to a fault such as a break or a short circuit in a wire harness, the combination of voltage levels input to the plurality of communication address setting terminals becomes the combination of voltage levels that has no assigned communication address. As a result, the combination does not overlap with the other combinations of voltage levels with the assigned communication addresses and according to the communication address information, an abnormality occurring in the combination of voltage levels input to the communication address setting terminals can be detected and predetermined abnormality processing can be performed. Therefore, abnormal operations can be prevented even in cases when the voltage level to be input to any one of the plurality of communication address setting terminals has inverted due to the fault.

According to the second aspect, the combination of the voltage levels with the assigned communication address in the communication address information (a) is selected from among a plurality of combinations of voltage levels in which the number of high levels included in the combination of the voltage levels becomes an "even number" or (b) is selected from among a plurality of combinations of the voltage levels in which the number of high levels included in the combination of the voltage levels becomes an "odd number." Thus, the number of communication address setting terminals to which the high level is input becomes the "odd number" when the voltage level of one of the plurality of communication address setting terminals has inverted due to, for example, a break or a short circuit in the wire harness for the above (a). Also, the number of communication address setting terminals to which the high level is input becomes the "even number" when the voltage level of one of the plurality of communication address setting terminals has inverted due to, for example, a break or a short circuit in the wire harness for the above (b). As a result, by counting the number of communication address setting terminals to which the high level is input, an abnormality of the combination of voltage levels can be detected and simple processing is achieved as compared with a configuration of detecting the combination of voltage levels with the assigned communication address with reference to, for example, a data table, and the abnormality occurring in the combination of voltage levels input to the plurality of communication address setting terminals can be detected easily at high speed.

According to the third aspect, the communication address detection apparatus of the first or second aspect is included, so that abnormal operations can be prevented even in cases when the voltage level to be input to any one of the plurality of communication address setting terminals has inverted due to the fault.

BRIEF DESCRIPTION OF THE DRAWINGS

FIG. 8 is a diagram describing another example of communication address information stored in the ROM of the IC chip.

FIG. 9 is a diagram describing a further example of communication address information stored in the ROM of the IC chip.

DESCRIPTION OF THE EMBODIMENTS

A connector with a built-in control circuit which is one embodiment of the invention will hereinafter be described with reference to FIGS. 2 to 7.

The connector with built-in control circuit is used for connecting electronic devices such as various actuators for, for example, opening and closing a window or adjusting an angle of a door mirror to a controller such as an ECU for controlling their electronic devices through a network by data communication. For that purpose, a circuit element etc. for controlling data communication etc. are built into the connector with built-in control circuit.

Figure 1:
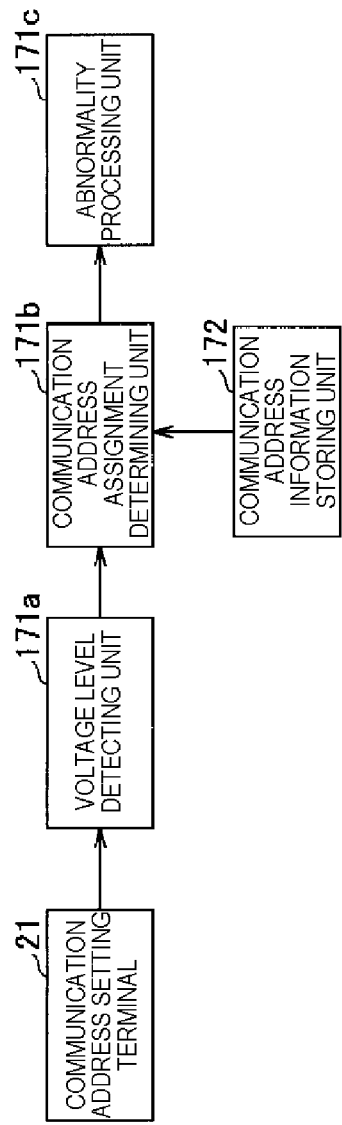
FIG. 1 is a diagram showing a basic configuration of a communication address detection apparatus of the invention.
Figure 2:
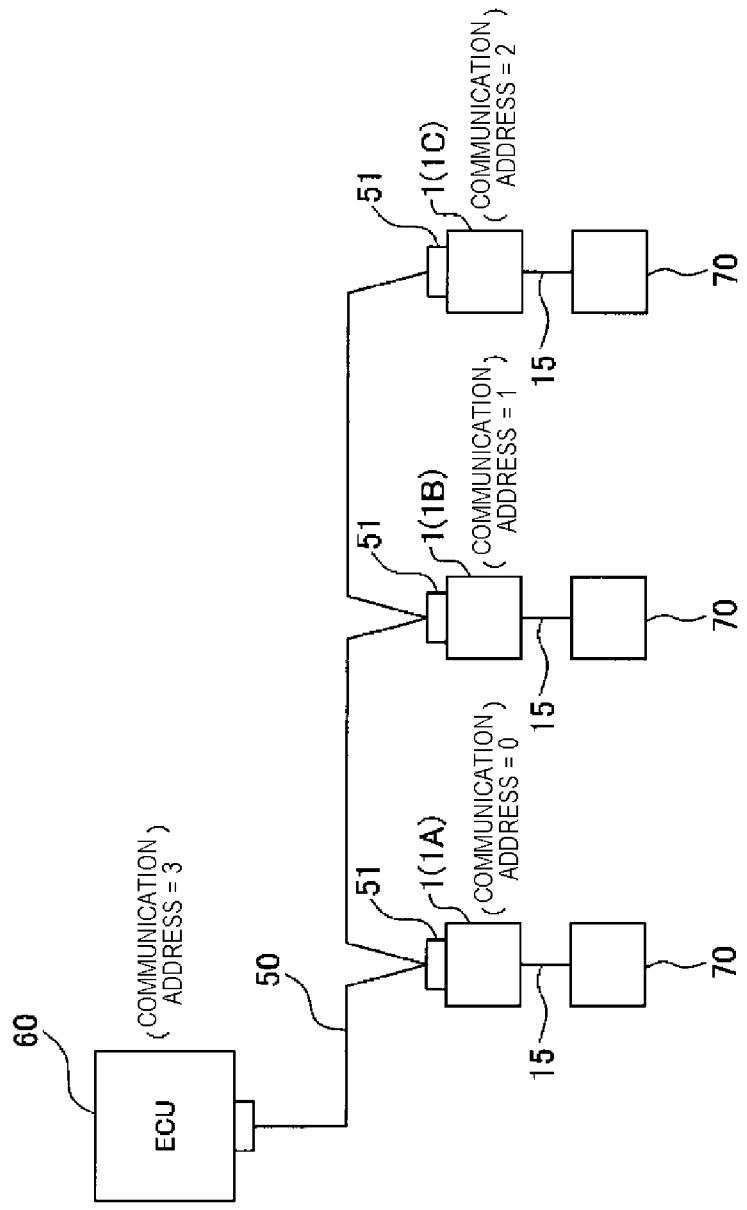
FIG. 2 is a schematic configuration diagram showing one example of a communication system using a connector with a built-in control circuit which is one embodiment of the invention.

As shown in FIG. 2, such a connector with built-in control circuit (shown by numeral 1 in the drawing) is connected to an electronic device 70 such as an actuator through an electric wire 15 in a one-to-one correspondence. Then, the plurality of connectors 1 (numerals 1A, 1B, 1C) with built-in control circuits connected to the electronic devices 70 are respectively connected to a plurality of harness side connectors 51 provided in one wire harness 50. Also, an electronic control unit (ECU) 60 is connected to one end of the wire harness 50, and the plurality of connectors 1 with the built-in control circuits are mutually connected to the ECU 60 by a bus.

By connecting (fitting) each of the connectors 1A, 1B, 1C with the built-in control circuits to the harness side connectors 51, a combination of voltage levels of a high level (that is, "1") or a low level (that is, "0") with assigned communication addresses different mutually are input to a plurality of communication address setting terminals A described below included by each of the connectors. In a configuration of FIG. 2, communication addresses "0", "1", "2" are respectively set in the connectors 1A, 1B, 1C with the built-in control circuits and a communication address "3" is set in the ECU 60.

Each of the connectors 1A, 1B, 1C with the built-in control circuits receives, for example, various pieces of control information traveling on the wire harness 50 and determines whether or not the received control information is to be processed according to the set communication addresses. Then, in the case of determining that the control information is to be processed, the control information is sent to the electronic device 70 and also in the case of determining that the control information is not to be processed, the control information is discarded.

Figure 3:
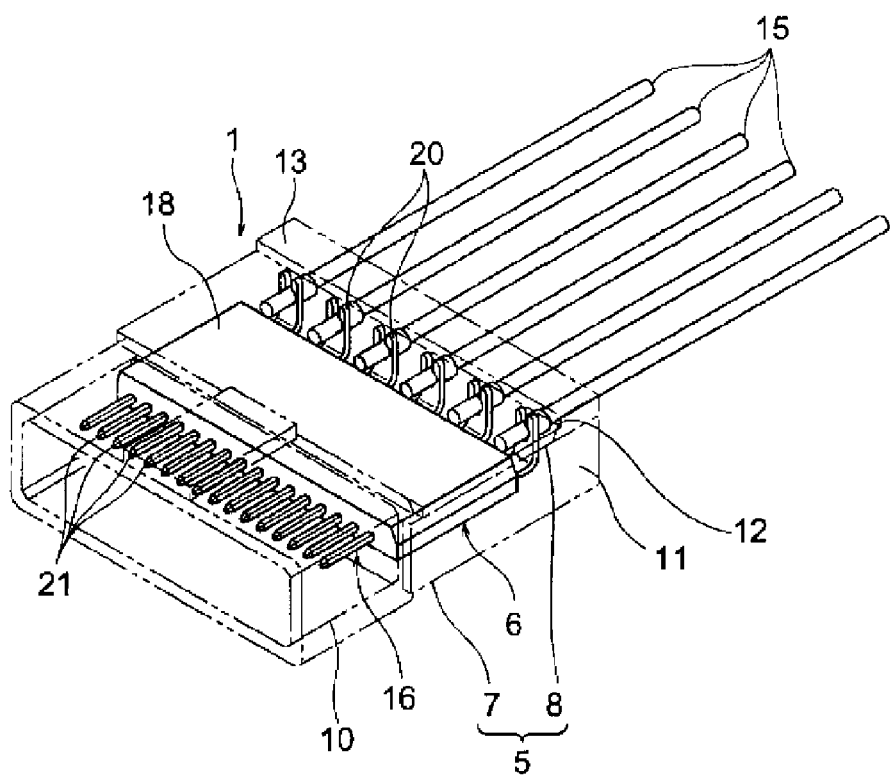
FIG. 3 is a perspective view of the connector with built-in control circuit of FIG. 2.

As shown in FIG. 3, the connector 1 with the built-in control circuit includes an outer housing 5 and a control circuit package 6. The outer housing 5 is formed in a flat box shape, and includes a unit housing 7 and a cover part 8.

The unit housing 7 is made of an insulating synthetic resin, and integrally includes a tubular hood part 10 and a control circuit package receiving chamber 11 being continuous to the hood part 10. A connector housing of the harness side connector 51 provided on the wire harness 50 enters the hood part 10, and the hood part 10 is fitted into the harness side connector 51. The control circuit package receiving chamber 11 is formed in a U-shaped cross section and is provided with an opening 12 toward an upper portion of FIG. 3.

The cover part 8 is made of an insulating synthetic resin, and is formed in a flat plate shape. The cover part 8 is attached to the unit housing 7 so as to close the opening 12.

Figure 4:
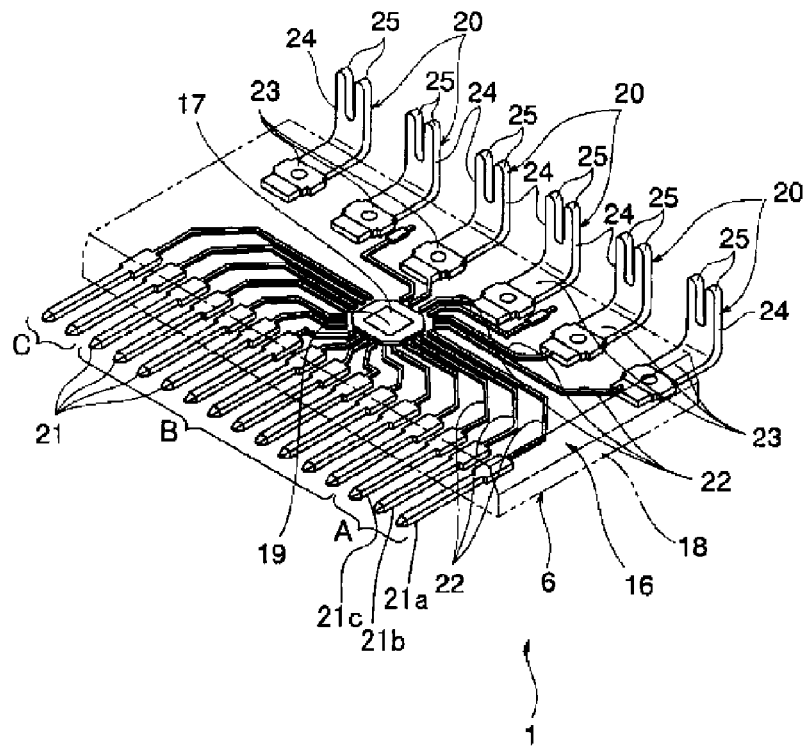
FIG. 4 is a perspective view of a control circuit package included by the connector with built-in control circuit of FIG. 2.

As shown in FIG. 4, the control circuit package 6 includes a lead frame 16, an IC chip 17 as a circuit element, and a resin sealing body 18. The lead frame 16 is constructed of a conductive metal, and integrally includes a chip holding part 19, a plurality of press-contact terminals 20, a plurality of male tabs 21 and a plurality of joints 22. The control circuit package 6 is received in the control circuit package receiving chamber 11 of the unit housing 7.

The chip holding part 19 is formed in a flat plate shape. The chip holding part 19 is positioned by bonding the IC chip 17 on a surface of the chip holding part 19 by epoxy, Ag paste, solder, etc.

The press-contact terminal 20 integrally includes a parallel part 23 and an erect part 24. The parallel part 23 is formed in a band plate shape, and both surfaces of the parallel part 23 are provided in the same plane as both surfaces of the chip holding part 19. The erect part 24 is erected from one end of the parallel part 23 of the press-contact terminal 20 toward an upper portion of FIG. 4. The plurality of press-contact terminals 20 are arranged so that their parallel parts 23 are mutually parallel and their erect parts 24 are respectively erected in the same direction as shown in FIG. 4. Also, the other ends of the parallel parts 23 of the plurality of press-contact terminals 20 are turned to the side of the chip holding part 19.

The erect part 24 includes a pair of crimp blades 25 mutually spaced along a width direction of the press-contact terminals 20, that is, a direction in which the plurality of press-contact terminals 20 are mutually arranged. The electric wire 15 is pinched between the mutual crimp blades 25 and also a coated part of the electric wire 15 is cut and the crimp blades 25 make contact with its core wire. In the illustrated example, both surfaces of the erect part 24 are orthogonal to both surfaces of the parallel part 23.

The male tabs 21 are formed in linearly-extending bar shapes. The plurality of male tabs 21 are mutually spaced in parallel. These plurality of male tabs 21 position the chip holding part 19 between the male tabs 21 and the plurality of press-contact terminals 20. The male tab 21 is arranged inside the hood part 10 with the top of the male tab 21 turned toward an opening of the hood part 10 and when the harness side connector 51 is fitted into the hood part 10, the male tab 21 is electrically connected to a terminal fitting (not shown) of the harness side connector 51.

As shown in FIG. 4, a portion of the plurality of male tabs 21 are assigned to the communication address setting terminals A (shown by numerals 21*a*, 21*b*, 21*c*), and another portion of the male tabs 21 are assigned to control information terminals B, and the other portion of the male tabs 21 are assigned to power source terminals C.

The joints 22 are respectively formed to be bent from the press-contact terminals 20 and the male tabs 21 toward the chip holding part 19. A portion of the joints 22 make connection between the chip holding part 19 and the press-contact terminals 20, and the other portion of the joints 22 make connection between the chip holding part 19 and the male tabs 21.

The IC chip 17 is a circuit element arranged on the chip holding part 19 and attached to the lead frame 16. The IC chip 17 is connected to each of the joints 22 by well-known bonding wires. The IC chip 17 makes electrical connection between the press-contact terminals 20 and the male tabs 21 through the joints 22 according to a predetermined pattern. Thus, the IC chip 17 is mounted on the lead frame 16.

Figure 5:
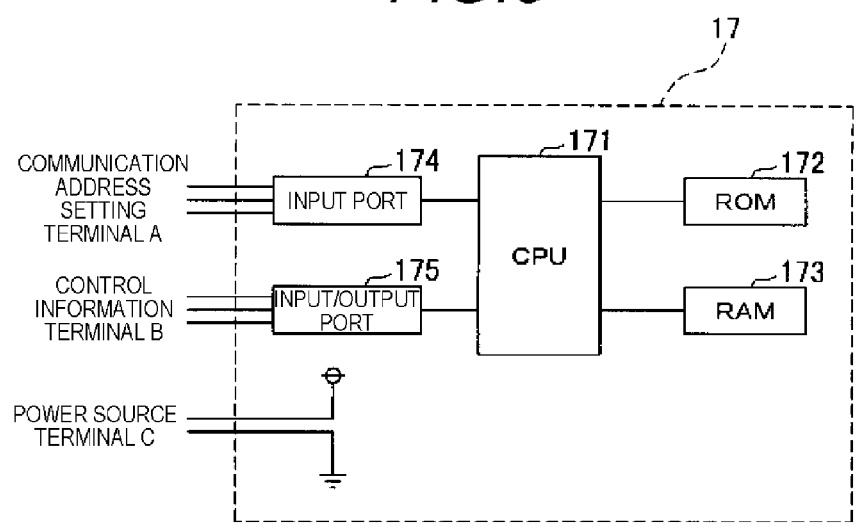
FIG. 5 is a diagram showing a schematic configuration of an IC (that is, Integrated Circuit) chip included by the control circuit package.

The IC chip 17 is a well-known microcomputer, and includes a central processing unit (CPU) 171, ROM 172 which is read only memory, RAM (that is, Random Access Memory) 173 which is readable and rewritable memory, an input port 174, and an input/output port 175 as shown in FIG. 5. The IC chip 17 corresponds to a communication address detection apparatus in the claims.

The CPU 171 performs various control in the connector 1 with the built-in control circuit, and executes various processing including control according to the invention on the basis of various control programs stored in the ROM 172. The ROM 172 stores the control programs or various pieces of information such as communication address information J1 in which a relation between combinations of voltage levels input to the communication address setting terminals 21*a*, 21*b*, 21*c* and communication addresses assigned to the combinations is preset. That is, the ROM 172 corresponds to a communication address information storing unit in the claims.

Figures 6, 7:
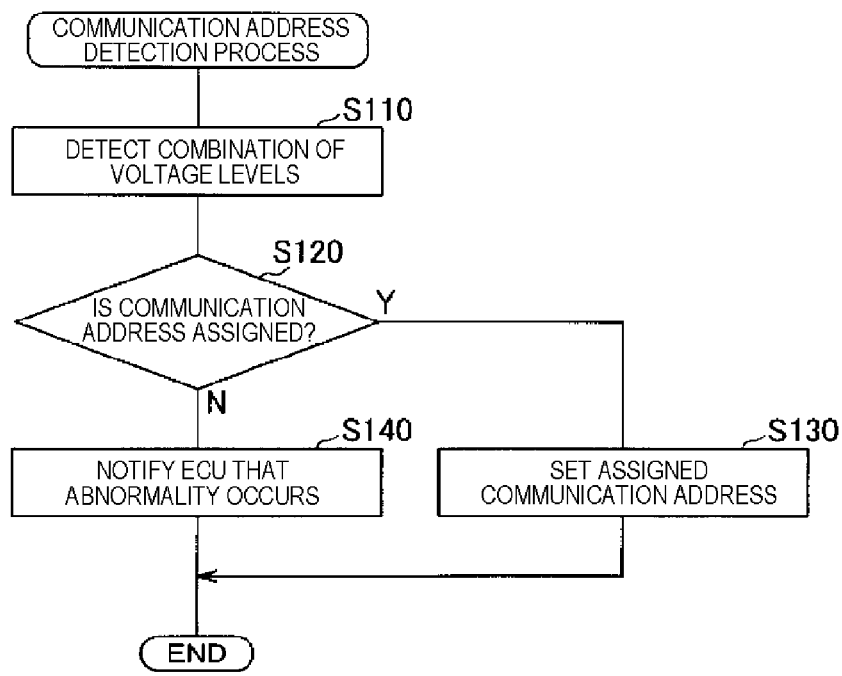
FIG. 6 is a diagram describing one example of communication address information stored in ROM (that is, Read-Only Memory) of the IC chip.
FIG. 7 is a flowchart showing one example of operations according to the invention in a CPU of the IC chip.
Figure 10:
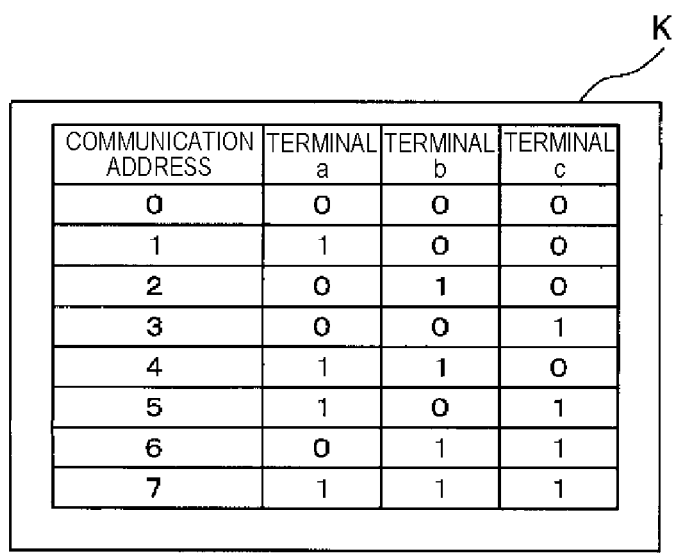
FIG. 10 is a diagram showing a communication address table showing one example of a relation between combinations of voltage levels input to communication address setting terminals and communication addresses assigned to the combinations in a conventional communication address detection apparatus.

As shown in FIG. 6, the communication address information J1 has a communication address table J11 indicating a relation between combinations of voltage levels input to the communication address setting terminals 21*a*, 21*b*, 21*c* and communication addresses assigned to the combinations, and high level number kind information J12 indicating a kind (an even number or an odd number) of the number of high levels included in the combinations of voltage levels with the assigned communication addresses in the communication address table J11.

Only the combinations of voltage levels with the assigned communication addresses are set in the communication address table J11. In other words, a communication address is not assigned to a combination of voltage levels which are not included in the communication address table J11, and it can be determined that an abnormality occurs when such a combination of voltage levels is detected. Also, the combinations of voltage levels included in the communication address table J11 are set so that the number of high levels (that is, the number of "1") included in the combinations becomes an "even number". The embodiment is set so that the number of high levels included in the combinations of voltage levels is 2 in the communication addresses "0" to "2" and is 0 in the communication address "3", that is, becomes the even number, respectively. Also, information indicating the "even number" is set in the high level number kind information J12.

Thus, the number of high levels included in the combination of voltage levels with the assigned communication address is set in the "even number" and thereby, the combination of voltage levels with the assigned communication address in the communication address table J11 of the communication address information J1 changes to a combination of voltage levels that has no assigned communication address when any one of the voltage levels in that voltage level combination has inverted (that is, the high level changes to the low level, or the low level changes to the high level).

For example, in the case where the combination of voltage levels with the assigned communication address is input to the communication address setting terminals 21*a*, 21*b*, 21*c*, when the high level is erroneously input to one communication address setting terminal to which the low level is to be input due to a fault such as a break in the wire harness, the number of communication address setting terminals to which the high level is input becomes the "odd number". Also, when the low level is erroneously input to one communication address setting terminal to which the high level is to be input due to a fault such as a short circuit in the wire harness, the number of communication address setting terminals to which the high level is input becomes the "odd number".

Then, since the communication address is not assigned to the combination in which the number of high levels included in the combination of voltage levels is the "odd number" in the communication address table J11, when the voltage level to be input to one communication address setting terminal has inverted as described above, the combination of voltage levels input to the communication address setting terminals 21*a*, 21*b*, 21*c* changes to a combination of voltage levels that has no assigned communication address, and does not overlap with the other combinations of voltage levels with the assigned communication addresses.

Also, an abnormality of the combination of voltage levels can be detected by counting the number of high levels included in the combination of voltage levels input to the communication address setting terminals and determining whether or not the number of high levels is the "even number". Also, in the embodiment, the number of high levels included in the combination of voltage levels with the assigned communication address is set in the "even number", but is not limited to this, and may be set in the "odd number".

Also, the ROM 172 stores programs for allowing the CPU 171 to function as various unit such as voltage level detecting unit, communication address allocation determining unit and abnormality processing unit. Then, the CPU 171 functions as various unit described above by executing the programs.

The RAM 173 properly stores data, programs, and the like, required for the CPU 171 to execute various processing. The RAM 173 is provided with an area (a communication address area) for setting a communication address detected in accordance with a combination of voltage levels input to the communication address setting terminals 21*a*, 21*b*, 21*c*. The CPU 171 performs, for example, processing determination of various pieces of control information received from the ECU 60 or generation of various pieces of control information sent to the ECU 60 using the communication addresses stored in this communication address area.

The input port 174 is a well-known general-purpose input port, and is connected to the communication address setting terminals A (that is, terminals 21a, 21b, 21c) of the male tabs 21, and voltage levels of these terminals enter to the CPU 171 via the input port 174. An input part to which the terminals 21a, 21b, 21c in the input port 174 is connected to a power source voltage through a resistor (not shown) inside the IC chip 17 (that is, pull-up), and the power source voltage or a high level near to the power source voltage is input as the voltage level. Then, when the harness side connector 51 is fitted into the connector 1 with the built-in control circuit, a predetermined terminal of the terminals 21a, 21b, 21c is connected to a ground through the wire harness 50, and 0 V or a low level near to 0 V is input to the input part of the input port 174 as the voltage level.

The input/output port 175 is a well-known general-purpose input/output port, and is connected to control information terminals B of the male tabs 21. The input/output port 175 inputs various pieces of control information sent from the ECU 60 through the wire harness 50 to the CPU 171, and outputs various pieces of control information generated by the CPU 171 to the ECU 60 through the wire harness 50. Also, power source system wiring (that is, a power source and a ground) of the IC chip 17 is connected to power source terminals C of the male tabs 21.

The resin sealing body 18 is made of a synthetic resin, and is formed in a flat box shape. The resin sealing body 18 seals the chip holding part 19, the parallel part 23 of each of the press-contact terminals 20, a proximal end by the chip holding part 19 in each of the male tabs 21 and each of the joints 22 by receiving their parts inside a mold and molding. That is, the resin sealing body 18 projects the press-contact terminals 20 and the male tabs 21, and seals the IC chip 17 and the lead frame 16.

Next, one example of an outline of communication address detection processing according to the invention executed by the CPU 171 described above will hereinafter be described with reference to a flowchart shown in FIG. 7.

When a power source of the connector 1 with the built-in control circuit is turned on, the CPU 171 executes predetermined initialization processing and then proceeds to step S110 shown in the flowchart of FIG. 7.

In step S110, a combination of voltage levels input to the input port 174, that is, a combination of voltage levels input to each of the communication address setting terminals 21a, 21b, 21c is detected. Then, the flowchart proceeds to step S120.

In step S120, it is determined whether or not a communication address is assigned to the combination of voltage levels detected in step S110. Concretely, it is determined whether or not the combination of voltage levels detected in step S110 is included in the communication address table J11 stored in ROM 172, and when the combination is included, it is determined that the communication address is assigned to the combination of voltage levels detected, and the flowchart proceeds to step S130 (Y in step S120), and otherwise, when the combination is not included, it is determined that the communication address is not assigned to the combination of voltage levels detected, and the flowchart proceeds to step S140 (N in step S120).

Or, in step S120, it may be determined whether or not the communication address is assigned to the combination of voltage levels using the number of high levels included in the combination of voltage levels detected in step S110. Concretely, the number of high levels included in the combination of voltage levels detected in step S110 is counted. Then, it may be determined that the communication address is assigned to the combination of voltage levels when a kind (that is, an even number or an odd number) of the number of high levels counted is equal to information set in the high level number kind information J12 and also, it may be determined that the communication address is not assigned to the combination of voltage levels (that is, an abnormality occurs) when the kind of the number of high levels counted is different from the information set in the high level number kind information J12. However, in the case of determining that the communication address is assigned to the combination of voltage levels using the number of high levels included in the combination of voltage levels detected as described above, it is necessary to assign the communication addresses to all the combinations of voltage levels in which the number of high levels becomes the even number (or the odd number).

By making the determination using the number of high levels included in the combination of voltage levels input to the communication address setting terminals 21a, 21b, 21c thus, simple processing is achieved as compared with a configuration of detecting the combination of voltage levels with the assigned communication address using, for example, a data table, and an abnormality occurring in the combination of voltage levels input to the communication address setting terminals 21a, 21b, 21c can be detected easily at high speed.

In step S130, the communication address assigned to the combination of voltage levels detected in step S120 is acquired from the communication address table J11 stored in ROM 172. Then, this acquired communication address is stored in the communication address area with which the RAM 173 is provided. In this manner, the communication address of the connector 1 with the built-in control circuit is detected (set). Then, processing of the present flowchart is ended.

In step S140, abnormality notification control information for notifying the ECU 60 that an abnormality occurs in the combination of voltage levels input to the communication address setting terminals 21a, 21b, 21c is generated, and is sent to the ECU 60 through the input/output port 175 and then, all the processing for preventing abnormal operations such as runaway is stopped (that is, predetermined abnormality processing). Then, processing of the present flowchart is ended.

Step S110 described above corresponds to voltage level detecting unit in the claim, and step S120 corresponds to communication address allocation determining unit in the claim, and step S140 corresponds to abnormality processing unit in the claim. Also, step S110 described above corresponds to a voltage level detecting step in the claim, and step S120 corresponds to a communication address allocation determining step in the claim, and step S140 corresponds to an abnormality processing step in the claim.

Next, one example of operations according to the invention in the connector 1 with the built-in control circuit described above will be described.

The connector 1 with the built-in control circuit is connected to the harness side connector 51 of the wire harness 50 and at this time, a combination (terminal 21a, terminal 21b, terminal 21c)=("1", "0", "1") of voltage levels to which "1" is assigned as a communication address shall be input to the communication address setting terminals 21a, 21b, 21c of the male tabs 21.

Then, when a power source of this connector 1 with the built-in control circuit is turned on, a combination of voltage levels input to the communication address setting terminals 21a, 21b, 21c is detected (step S110). Then, it is determined that this detected combination of voltage levels is a normal combination with the assigned communication address (Y in step S120), and the assigned communication address is set (step S130).

Also, even when a fault (for example, an electric wire of the wire harness 50 connected to the terminal 21*a* is broken, or an electric wire of the wire harness 50 connected to the terminal 21*b* is short-circuited to a ground) in which the voltage level has not inverted in the combination of voltage levels described above occurs, operation similar to the above is performed.

Also, when the terminal 21*b* is not connected to the ground due to, for example, a break in the wire harness 50, a combination (terminal 21*a*, terminal 21*b*, terminal 21*c*)=("1", "1", "1") of voltage levels that has no assigned communication address is input to the communication address setting terminals 21*a*, 21*b*, 21*c*. When the power source of this connector 1 with the built-in control circuit is turned on in this state, a combination of voltage levels input to the communication address setting terminals 21*a*, 21*b*, 21*c* is detected (step S110) and then, it is determined that this detected combination of voltage levels is an abnormal combination that has no assigned communication address (N in step S120), and the ECU 60 is notified that an abnormality occurs (step S140).

Also, when the terminal 21*a* is connected to the ground due to, for example, a short circuit in the wire harness 50, a combination (terminal 21*a*, terminal 21*b*, terminal 21*c*)=("0", "0", "1") of voltage levels that has no assigned communication address is input to the communication address setting terminals 21*a*, 21*b*, 21*c*. When the power source of this connector 1 with the built-in control circuit is turned on in this state, a combination of voltage levels input to the communication address setting terminals 21*a*, 21*b*, 21*c* is detected (step S110) and then, it is determined that this detected combination of voltage levels is an abnormal combination that has no assigned communication address (N in step S120), and the ECU 60 is notified that an abnormality occurs (step S140).

According to the invention as described above, the combination of voltage levels with the assigned communication address in the communication address table J11 of the communication address information J1 is set so that, when any one of the voltage levels in that voltage level combination has inverted (that is, the high level changes to the low level, or the low level changes to the high level), the combination becomes a combination of voltage levels that has no assigned communication address, so that when the voltage level input to one of the plurality of communication address setting terminals 21*a*, 21*b*, 21*c* to which the combination of voltage levels with the assigned communication address is input has inverted due to a fault such as a break or a short circuit in the wire harness 50, the combination of voltage levels input to the plurality of communication address setting terminals 21*a*, 21*b*, 21*c* becomes the combination of voltage levels that has no assigned communication address, with the result that the combination does not overlap with the other combinations of voltage levels with the assigned communication addresses and according to the communication address information J1, an abnormality occurring in the combination of voltage levels input to the communication address setting terminals 21*a*, 21*b*, 21*c* can be detected and predetermined abnormality processing can be performed. Therefore, abnormal operations can be prevented even in cases when the voltage level to be input to any one of the plurality of communication address setting terminals 21*a*, 21*b*, 21*c* has inverted due to the fault.

Also, since a combination of voltage levels with the assigned communication address in the communication address table J11 of the communication address information J1 is selected from among a plurality of combinations of voltage levels in which the number of high levels included in the combination of the voltage levels becomes an "even number", the number of communication address setting terminals to which the high level is input becomes an "odd number" when the voltage level of one of the plurality of communication address setting terminals 21*a*, 21*b*, 21*c* has inverted due to, for example, a break or a short circuit in the wire harness. As a result, by counting the number of communication address setting terminals to which the high level is input, an abnormality of the combination of voltage levels can be detected and simple processing is achieved as compared with a configuration of detecting the combination of voltage levels with the assigned communication address with reference to, for example, a data table, and the abnormality occurring in the combination of voltage levels input to the plurality of communication address setting terminals 21*a*, 21*b*, 21*c* can be detected easily at high speed.

In the embodiment, the number of high levels included in the combination of voltage levels with the assigned communication address is set in the "even number", but is not limited to this, and may be set in an "odd number". FIG. 8 shows one example of the communication address information in which the number of high levels included in the combination of the voltage levels with the assigned communication address becomes the "odd number". In the embodiment, communication address information J2 shown in FIG. 8 may be used instead of the communication address information J1 shown in FIG. 6.

Like the communication address information J1, the communication address information J2 has a communication address table J21 indicating a relation between combinations of voltage levels input to the communication address setting terminals 21*a*, 21*b*, 21*c* and communication addresses assigned to the combinations, and high level number kind information J22 indicating a kind (an even number or an odd number) of the number of high levels included in the combinations of voltage levels with the assigned communication addresses in the communication address table J21.

Only the combinations of voltage levels with the assigned communication addresses are set in the communication address table J21. In other words, a communication address is not assigned to a combination of voltage levels which are not included in the communication address table J21, and it can be determined that an abnormality occurs when such a combination of voltage levels is detected. Also, the combinations of voltage levels included in the communication address table J21 are set so that the number of high levels (that is, the number of "1") included in the combinations becomes an "odd number". Concretely, it is set so that the number of high levels included in the combinations of voltage levels is 1 in the communication addresses "0" to "2" and is 3 in the communication address "3", that is, becomes the odd number, respectively. Also, information indicating the "odd number" is set in the high level number kind information J22.

Thus, the number of high levels included in the combination of voltage levels with the assigned communication address is set in the "odd number" and thereby, the combination of voltage levels with the assigned communication address in the communication address table J21 of the communication address information J2 changes to a combination of voltage levels that has no assigned communication address when any one of the voltage levels in that voltage level combination has inverted (that is, the high level changes to the low level, or the low level changes to the high level). Also, an abnormality of the combination of voltage levels can be detected by counting the number of high levels included in the combination of voltage levels input to the communication address setting terminals and determining whether or not the number of high levels is the "odd number".

Also, in the embodiment, a configuration including three communication address setting terminals is shown, but the invention is not limited to this configuration, and can also be applied to a configuration including four or more communication address setting terminals. FIG. 9 shows one example of communication address information used in a configuration including four communication address setting terminals (terminal a, terminal b, terminal c, terminal d).

Like the communication address information J1, J2, communication address information J3 shown in FIG. 9 has a communication address table J31 indicating a relation between combinations of voltage levels input to the communication address setting terminals a, b, c, d and communication addresses assigned to the combinations, and high level number kind information J32 indicating a kind (an even number or an odd number) of the number of high levels included in the combinations of voltage levels with the assigned communication addresses in the communication address table J31.

Only the combinations of voltage levels with the assigned communication addresses are set in the communication address table J31. In other words, a communication address is not assigned to a combination of voltage levels which are not included in the communication address table J31, and it can be determined that an abnormality occurs when such a combination of voltage levels is detected. Also, the combinations of voltage levels included in the communication address table J31 are set so that the number of high levels (that is, the number of "1") included in the combinations becomes an "odd number". Concretely, it is set so that the number of high levels included in the combinations of voltage levels is 3 in the communication addresses "0" to "3" and is 1 in the communication addresses "4" to "7", that is, becomes the odd number, respectively. Also, information indicating the "odd number" is set in the high level number kind information J32.

Thus, the number of high levels included in the combination of voltage levels with the assigned communication address is set in the "odd number" and thereby, the combination of voltage levels with the assigned communication address in the communication address table J31 of the communication address information J3 changes to a combination of voltage levels that has no assigned communication address when any one of the voltage levels in that voltage level combination has inverted (that is, the high level changes to the low level, or the low level changes to the high level). Also, an abnormality of the combination of voltage levels can be detected by counting the number of high levels included in the combination of voltage levels input to the communication address setting terminals and determining whether or not the number of high levels is the "odd number".

Or, the combination of voltage levels with the assigned communication address may be selected arbitrarily so that, when any one of the voltage levels in that voltage level combination has inverted, the combination becomes a combination of voltage levels that has no assigned communication address. In other words, when an exclusive OR of the combination of voltage levels with the assigned communication address and combinations of voltage levels with the other assigned communication addresses is calculated with respect to each of the voltage levels (that is, each of the bits), the exclusive OR could become "true" with respect to at least two or more voltage levels. In brief, the exclusive OR becomes "false" when the values are the same, and the exclusive OR becomes "true" when the values differ, so that when there are two or more voltage levels with different values with respect to other combinations of voltage levels, the combinations of voltage levels do not become the same even in cases when one of the voltage levels has inverted.

As one example, a configuration including five communication address setting terminals (terminal a, terminal b, terminal c, terminal d, terminal e) includes, for example, the configuration in which combinations of voltage levels with assigned communication addresses are respectively set so that the communication address "0" is (terminal a, terminal b, terminal c, terminal d, terminal e)=("0", "0", "0", "0", "0") and the communication address "1" is (terminal a, terminal b, terminal c, terminal d, terminal e)=("0", "0", "0", "1", "1") and the communication address "2" is (terminal a, terminal b, terminal c, terminal d, terminal e)=("1", "1", "1", "0", "0") and the communication address "3" is (terminal a, terminal b, terminal c, terminal d, terminal e)=("1", "1", "1", "1", "1").

Also, in the embodiment, only the combinations of voltage levels with the assigned communication addresses are included in the communication address table J11, but it is not limited to this, and a combination of voltage levels that has no assigned communication address may be included in the communication address table J11. Then, an abnormality of the combination of voltage levels input to the communication address setting terminals may be detected by determining whether or not the combination of voltage levels input to the communication address setting terminals 21a, 21b, 21c matches with the combination of voltage levels that has no assigned communication address of the communication address table J11.

Also, in the embodiment, the abnormality of the combination of voltage levels input to the communication address setting terminals 21a, 21b, 21c may be detected by counting the number of high levels included in the combination of voltage levels input to the communication address setting terminals 21a, 21b, 21c and determining whether or not a kind (that is, an even number or an odd number) of the number of high levels counted matches with the high level number kind information J12.

Also, in an incomplete fitting state in which the connector 1 with the built-in control circuit is incompletely fitted into the harness side connector 51, there is fear that the communication address setting terminals 21a, 21b, 21c do not make contact with terminal fittings of the harness side connector 51 and all the voltage levels input to the communication address setting terminals become high levels. Hence, the communication address is not assigned to the combination of voltage levels with all the high levels and then, when the combination of voltage levels input to the communication address setting terminals 21a, 21b, 21c has all the high levels, abnormality notification control information to the effect that incomplete fitting of the connector occurs may be sent to the ECU 60. By such a configuration, a cause of an abnormality occurring in the connector 1 with the built-in control circuit can be found in more detail and recovery work can be done speedily.

Also, the embodiment is constructed so that a portion of the male tabs 21 are assigned to the communication address setting terminals 21a, 21b, 21c and the predetermined communication address setting terminals are connected to the ground through the wire harness, but it is not limited to this, and any configuration of the communication address setting terminals can be used unless the configuration is contrary to the object of the invention, for example, the input port 174 of the IC chip 17 is connected to the ground through a DIP switch, a jumper switch, etc.

In addition, the embodiment described above only shows a typical form of the invention, and the invention is not limited to the embodiment. That is, various modifications can be made without departing from the gist of the invention.

The invention has been described in detail with reference to the specific embodiment, but it is apparent to those skilled in the art that various changes or modifications can be made without departing from the spirit and scope of the invention.

The present application is based on Japanese patent application (patent application No. 2009-094589) filed on Apr. 9, 2009, and the contents of the patent application are hereby incorporated by reference.

REFERENCE SIGNS LIST

1: CONNECTOR WITH BUILT-IN CONTROL CIRCUIT
17: IC CHIP (COMMUNICATION ADDRESS DETECTION APPARATUS)
171: CPU (VOLTAGE LEVEL DETECTING UNIT, COMMUNICATION ADDRESS ALLOCATION DETERMINING UNIT, ABNORMALITY PROCESSING UNIT)
172: ROM (COMMUNICATION ADDRESS INFORMATION STORING UNIT)
21: MALE TAB
21*a*, 21*b*, 21*c*: COMMUNICATION ADDRESS SETTING TERMINAL
J1, J2, J3: COMMUNICATION ADDRESS INFORMATION
J11, J21, J31: COMMUNICATION ADDRESS TABLE
J12, J22, J32: HIGH LEVEL NUMBER KIND INFORMATION

The invention claimed is:

1. A communication address detection apparatus for detecting a communication address in accordance with a combination of voltage levels of high or low levels input to a plurality of communication address setting terminals, the communication address detection apparatus comprising:
a communication address information storing unit in which communication address information is stored, the communication address information being determined so that a relation between combinations of the voltage levels and communication addresses assigned to the combinations is preset and also the combination of the voltage levels with the assigned communication address is set so as to become a combination of the voltage levels that has no assigned communication address when any one of the voltage levels in the combination of the voltage levels has inverted;
a voltage level detecting unit that detects the combination of the voltage levels input to the plurality of communication address setting terminals;
a communication address assignment determining unit, communicating with the voltage detecting unit and the communication address information storing unit, that determines whether or not the communication address is assigned to the combination of the voltage levels detected by the voltage level detecting unit according to the communication address information stored in the communication address information storing unit; and
an abnormality processing unit, communicating with the communication address assignment determining unit, that performs predetermined abnormality processing when the communication address assignment determining unit determines that the communication address is not assigned to the combination of the voltage levels detected by the voltage level detecting unit, wherein
the combinations of the voltage levels with the assigned communication addresses in the communication address information are selected from among a plurality of combinations of the voltage levels in which the number of high levels included in the combination of the voltage levels becomes an even number, or are selected from among a plurality of combinations of the voltage levels in which the number of high levels included in the combination of the voltage levels becomes an odd number,
the communication address information includes additional information indicating an even number or an odd number of the number of high levels included in the combinations of voltage levels assigned with the communication address, and
the communication address assignment determining unit performs determination by comparing the number of high levels included in the combination of the voltage levels with the additional information.

2. A connector with a built-in control circuit, comprising:
a plurality of communication address setting terminals; and
a communication address detection apparatus for detecting a communication address in accordance with a combination of voltage levels of high or low levels input to the plurality of communication address setting terminals, wherein
the communication address detection apparatus according to claim 1 is provided as the communication address detection apparatus of the connector with the built-in control circuit.

3. A communication address detection method used in a communication address detection apparatus for detecting a communication address in accordance with a combination of voltage levels of high or low levels input to a plurality of communication address setting terminals, the communication address detection method sequentially comprising:
a voltage level detecting step of detecting the combination of the voltage levels input to the plurality of communication address setting terminals;
a communication address assignment determining step of determining whether or not the communication address is assigned to the combination of the voltage levels detected in the voltage level detecting step in accordance with communication address information in which a relation between combinations of the voltage levels and communication addresses assigned to the combinations are preset and also the combination of the voltage levels with the assigned communication address is set so as to become a combination of the voltage levels that has no assigned communication address when any one of the voltage levels in that voltage level combination has inverted; and
an abnormality processing step of performing predetermined abnormality processing when the communication address assignment determining step determines that the communication address is not assigned to the combination of the voltage levels detected in the voltage level detecting step, wherein
the combinations of the voltage levels with the assigned communication addresses in the communication address information are selected from among a plurality of combinations of the voltage levels in which the number of high levels included in the combination of the voltage levels becomes an even number, or are selected from among a plurality of combinations of the voltage levels in which the number of high levels included in the combination of the voltage levels becomes an odd number, the communication address information includes additional information indicating an even number or an odd number of the number of high levels included in the combinations of voltage levels assigned with the communication address, and the communication address assignment determining step performs determination by comparing the number of high levels included in the combination of the voltage levels with the additional information.

\* \* \* \* \*